United States Patent
Falc et al.

(10) Patent No.: US 11,648,463 B2
(45) Date of Patent: May 16, 2023

(54) GAME CONTROLLER COMPRISING AT LEAST ONE REMOVABLE ADJUSTING ELEMENT ALLOWING ADJUSTMENT OF THE STOP ANGLE OF A PIVOTING CONTROL MEMBER OF THE CONTROLLER

(71) Applicant: NACON, Fretin (FR)

(72) Inventors: Alain Falc, Fretin (FR); Antoine Vandekerckhove, Fretin (FR); Valentin Delrue, Fretin (FR); Yannick Allaert, Fretin (FR)

(73) Assignee: NACON, Fretin (FR)

( * ) Notice: Subject to any disclaimer, the term of this patent is extended or adjusted under 35 U.S.C. 154(b) by 0 days.

(21) Appl. No.: 17/287,309

(22) PCT Filed: Oct. 24, 2019

(86) PCT No.: PCT/EP2019/079006
§ 371 (c)(1),
(2) Date: Apr. 21, 2021

(87) PCT Pub. No.: WO2020/084041
PCT Pub. Date: Apr. 30, 2020

(65) Prior Publication Data
US 2021/0354030 A1    Nov. 18, 2021

(30) Foreign Application Priority Data
Oct. 25, 2018  (FR) ...................................... 1859850

(51) Int. Cl.
*A63F 13/24* (2014.01)
*A63F 13/22* (2014.01)

(52) U.S. Cl.
CPC .............. *A63F 13/22* (2014.09); *A63F 13/24* (2014.09)

(58) Field of Classification Search
CPC ................................. A63F 13/22; A63F 13/24
See application file for complete search history.

(56) References Cited

U.S. PATENT DOCUMENTS

| 5,883,690 A * | 3/1999 | Meyers | ................... A63F 13/02 345/157 |
| 7,338,374 B2 * | 3/2008 | Hammond | .............. A63F 13/24 463/36 |

(Continued)

FOREIGN PATENT DOCUMENTS

| FR | 2826589 A1 | 1/2003 |
| FR | 2720009 A1 | 5/2018 |

(Continued)

OTHER PUBLICATIONS

Int'l Search Report for PCT/EP2019/079006, dated Jan. 29, 2020.

(Continued)

*Primary Examiner* — David L Lewis
*Assistant Examiner* — Shauna-Kay Hall
(74) *Attorney, Agent, or Firm* — David D. Brush; Westman, Champlin & Koehler, P.A.

(57) ABSTRACT

A game controller includes an assembled shell and at least one control member which passes through the assembled shell and includes, outside the assembled shell, a head for manipulating the control member. The head is pivotable in all directions from a rest position into which it returns in a rotationally elastic manner. The game controller further includes at least one adjusting element for adjusting the stop angle (α) of the control member and is able to be removably mounted on the control member and removed from the control member without disassembling the shell of the game controller. The control member is provided with the removable adjusting element tiltable in each tilt direction until it (Continued)

reaches a stop position in which the adjusting element abuts and allows the tilting of the control member to be blocked.

23 Claims, 7 Drawing Sheets

(56) References Cited

U.S. PATENT DOCUMENTS

| | | | | |
|---|---|---|---|---|
| 9,710,072 | B1* | 7/2017 | Strahle | G06F 3/033 |
| 9,868,058 | B2 | 1/2018 | Gassoway et al. | |
| 9,971,420 | B2 | 5/2018 | Strahle et al. | |
| 2012/0274563 | A1* | 11/2012 | Olsson | G05G 9/047 |
| | | | | 345/161 |
| 2014/0323220 | A1* | 10/2014 | Lee | A63F 13/00 |
| | | | | 463/37 |
| 2015/0194279 | A1* | 7/2015 | Rubio | A63F 13/24 |
| | | | | 200/331 |
| 2016/0287986 | A1 | 10/2016 | Sidwell | |
| 2016/0317920 | A1 | 11/2016 | Schmitz et al. | |
| 2016/0346680 | A1* | 12/2016 | Tsai | B29C 70/76 |
| 2016/0361636 | A1* | 12/2016 | Gassoway | A63F 13/24 |
| 2016/0361639 | A1 | 12/2016 | Schmitz et al. | |
| 2017/0368452 | A1* | 12/2017 | Tiffany | G05G 9/047 |
| 2018/0059804 | A1* | 3/2018 | Strahle | G06F 3/033 |
| 2018/0200617 | A1* | 7/2018 | Tiffany | A63F 13/24 |
| 2018/0264355 | A1* | 9/2018 | Burgess | A63F 13/20 |
| 2019/0270006 | A1* | 9/2019 | Guerrero, Jr. | G05G 9/047 |
| 2021/0283495 | A1* | 9/2021 | Wang | A63F 13/24 |

FOREIGN PATENT DOCUMENTS

| | | |
|---|---|---|
| RU | 2658139 C1 | 6/2018 |
| WO | 2016110586 A1 | 7/2016 |
| WO | 2016191009 A1 | 12/2016 |
| WO | 2016200548 A1 | 12/2016 |
| WO | 2016200615 A1 | 12/2016 |
| WO | 2018093328 A1 | 5/2018 |

OTHER PUBLICATIONS

Int'l Search Report for Russian Patent Appln. No. 2021107873, dated Nov. 18, 2021.
English translation of the Written Opinion of the International Searching Authority dated Jan. 29, 2020 for corresponding International Application No. PCT/EP2019/079006, filed Oct. 24, 2019.

* cited by examiner

GAME CONTROLLER COMPRISING AT LEAST ONE REMOVABLE ADJUSTING ELEMENT ALLOWING ADJUSTMENT OF THE STOP ANGLE OF A PIVOTING CONTROL MEMBER OF THE CONTROLLER

TECHNICAL FIELD

The present invention relates to the field of game controllers comprising at least one pivoting control member, of the pivoting "stick" type, in particular of the "joystick" or "thumbstick" type, tiltable in all directions. In this field, it relates to an improvement allowing a user of the game controller to easily modify the responsiveness of the pivoting control member so as to better adapt the controller to the type of game controlled by the controller.

PRIOR ART

It is now common practice to control a video game using a game controller comprising at least one pivoting control member, of the analog pivoting stick type, in particular of the "joystick" or "thumbstick" type, tiltable in all directions.

Usually, the pivoting control member comprises a central rest position, in which it is elastically rotated, and is coupled to displacement sensors measuring the rotation of this member, relative to this rest position, about two perpendicular axes. The analog measurement signals delivered by these displacement sensors are automatically processed by software embedded in the game controller, so that manual actuation of this pivoting control member by the player makes it possible to interact with a video game, for example to move a character or an object in a video game.

More particularly, to control video games, it is now customary to use a game controller comprising two pivoting members, generally designated "joysticks" and sometimes also designated "thumbsticks", which can be actuated independently of one another, using the right and left thumbs, respectively, of a player holding the controller.

This type of game controller is described for example in the following publications: international patent applications WO2016/200548, WO2016/200615, WO2016/110586; U.S. Pat. Nos. 9,971,420, 9,710,072, 9,868,058.

In practice, such a game controller comprises an assembled shell, generally in the form of at least two half-shells assembled together by any means, for example by means of screws and/or by gluing and/or by welding. This shell is generally ergonomic so as to facilitate the gripping of the controller by a player.

The electronic control means of the controller are housed inside said assembled shell. These electronic control means comprise in particular:
the aforementioned displacement sensors, one or more electronic memories,
a processor which is capable of automatically executing embedded software, and which can be implemented for example by means of a microprocessor, a microcontroller, a programmable electronic circuit of the FPGA type or a specific electronic circuit of the ASIC type,
the connectors allowing the processor to communicate with a game console or the like.

For each joystick-type pivoting control member, the shell of the game controller comprises an opening through which the pivoting control member is passed.

More particularly, each pivoting member comprises a pivoting base element which is passed through an opening in the shell, the lower end of which is housed inside the assembled shell and is coupled to the displacement sensors, and an ergonomic head for manipulating the pivoting control member, and for example a head whose upper surface may be domed in a concave or convex shape or may be flat.

Originally, the head and the pivoting base element were designed to form a monolithic unit made in one piece or in several pieces permanently assembled together.

More recently, in order in particular to allow a player to choose the control member head which suits him the best, game controller manufacturers have proposed game controllers with several easily interchangeable pivoting control member heads of the "joystick" type. On this subject, reference may be made to the aforementioned publications WO2016/200548 and WO2016/200615, which describe solutions for pivoting control members of the "joystick" type for a game controller, the head of which can be removably mounted on the pivoting base element; the means for assembling the head and the pivoting base element may be of the mechanical type only or at least in part of the magnetic type.

In the game controllers known to date, the pivoting control member of the "joystick" type can be tilted in rotation manually, from its rest position, and in all directions to an extreme position, hereinafter referred to as "stop position," in which the pivoting control member is in abutment and its tilting is blocked. This stop position for each tilting direction of the pivoting control member makes it possible to define a stop angle of the pivoting control member with respect to its rest position. When the user releases the pivoting control member, the latter is elastically returned in rotation to its rest position, by suitable mechanical return means of the return spring(s) type.

Generally, the rest position of the pivoting control member is a central position and the value of the stop angle of the pivoting control member is the same over 360° for all tilting directions of the control member and is of the order of 38°. It is nevertheless conceivable to provide a pivoting control member for a game controller having at least two different angle values for different tilting directions.

Depending on the type of game controller, the stop position of the pivoting control member can be obtained in different ways.

In a first known type of game controller, this stop position is obtained by using, as a lower rotation stop, the peripheral edge of the opening through which the pivoting control member has passed or the inner edge of an attached ring fastened at this opening and surrounding the pivoting control member.

In a second known type of game controller, described in particular in publications WO2016/200548 and WO2016/200615, this stop position is obtained by means of a dome-shaped part, which is fastened to the pivoting control member while being housed inside the shell of the game controller, and which is adapted to come into abutment with a part internal to the shell of the controller with an upper stop function. This upper stop is for example constituted by an inner part of the shell near the opening through which the pivoting control member has passed or by a part internal to the shell of an attached ring fastened at this opening and surrounding the pivoting control member.

With certain video games, and for example with fighting games, it is desirable for the player to be able to be as responsive as possible and to this end to have a more responsive game controller allowing him to bring the pivoting control member in the stop position in a tilted direction as quickly as possible. With other types of video games, the speed with which the pivoting control member is brought into the stop position is less critical and the game controller used may therefore be less responsive.

PURPOSE OF THE INVENTION

The main objective of the invention is thus to propose a new technical solution which allows a player to easily and quickly modify the responsiveness of a game controller, in particular to adapt it to different types of video games.

A more particular objective of the invention is to provide a new technical solution which allows a player to easily and quickly increase the responsiveness of a game controller, in particular to make it more suitable for use with fighting video games.

SUMMARY OF THE INVENTION

The object of the invention is thus a game controller comprising an assembled shell and control means comprising at least one control member, which is passed through the assembled shell, which comprises, on the outside of the assembled shell, a head for manipulating the control member, which is pivotable and can be tilted manually in all directions from a rest position into which it returns in a rotationally elastic manner.

Characteristically according to the invention, the control means further comprise at least one adjusting element for adjusting the stop angle of the control member, which adjusting element can be removably mounted on the control member and removed from the control member without disassembling the shell of the game controller; the control member provided with said removable adjusting element can be tilted manually in each tilt direction until it reaches a stop position in which the adjusting element abuts and allows the tilting of the control member to be blocked.

More specifically, the game controller according to the invention may comprise the following additional and optional features, taken in isolation, or in combination with each other:
- the head of the control member is removable and said adjusting element is able to be removably mounted on the control member when the head is removed.
- said adjusting element is a ring, which is able to be slipped in a removable manner on a part of the control member when the head is removed.
- the control member comprises an assembly end piece having an open cavity in the upper part; a part of the removable head can be inserted into said cavity, and said adjusting element can be removably mounted, and preferably removably slipped onto the assembly end piece when the head is removed.
- said adjusting element is able to be removably mounted on the control member by being axially blocked between the head of the control member and another part of the control member.
- the value of the stop angle ($\alpha$), which is the tilt angle, with respect to its rest position, of the control member provided with said adjusting element and tilted in the stop position, is identical for all tilting directions of the control member.
- the value of the stop angle ($\alpha$), which is the tilt angle, with respect to its rest position, of the control member provided with said adjusting element and tilted in the stop position, is less than 90° and preferably between 20° and 70°.
- the stop angle ($\alpha$) being the tilt angle, with respect to its rest position, of the pivoting control member provided with said adjusting element and tilted in the stop position, said controller comprises at least two different adjusting elements, and preferably at least three different adjusting elements, which allow said blocking of the tilt of the member in the stop position with different respective stop angle values ($\alpha$) for each identical tilt direction.
- the game controller comprises an inner edge, which surrounds the control member and which delimits an opening in the assembled shell through which the control member is positioned, and said inner edge acts as a bottom rotational stop when the control member provided with said adjusting element is tilted in the stop position.
- The game controller comprises an inner edge, which surrounds the control member and which delimits an opening in the assembled shell through which the control member (3) is positioned, and the adjusting element, when mounted on the control member, is positioned through said opening, one part of the adjusting element being housed inside the shell and another part of the adjusting element being positioned outside the shell.
- each adjusting element is a cylindrical adjusting ring.
- the outer face of each cylindrical adjusting ring forms a straight cylinder with a circular cross-section over at least part of the height of the adjusting ring.
- the game controller comprises at least two different adjusting elements, and preferably at least three different adjusting elements, constituted respectively by adjusting rings, the outer face of which forms a straight cylinder with a circular cross-section over at least part of the height of the adjusting ring, and the outer diameters of said cylindrical parts with a circular cross-section of the outer faces of the adjusting rings are different.
- the adjusting rings have the same internal cross-section, and in particular the same internal diameter, and preferably the adjusting rings have the same height.
- part of the pivoting control member is housed and is fastened inside the assembled shell, and the game controller comprises sensors positioned inside the assembled shell and measuring the rotation of the pivoting control member.

The invention also relates to an adjusting element for adjusting the stop angle of the pivoting control member of a game controller comprising an assembled shell through which the control member has passed, which control member comprises a head for manipulating it on the outside of the shell, and is able to be tilted manually in all directions, from a rest position into which it returns in a rotationally elastic manner, to a stop position. This adjusting element for adjusting the stop angle of the pivoting control member is able to be removably mounted on the control member and to be removed from the control member without disassembling the shell from the game controller.

More specifically, the adjusting element may comprise the following additional and optional features, taken in isolation, or in combination with each other:
- the adjusting element for a game controller consists of a removable ring.
- the adjusting element for a game controller is constituted by a removable ring, the outer face of which forms a straight cylinder with a circular cross-section over at least part of the height of the adjusting ring.

Another object of the invention is also an assembly comprising at least two aforementioned adjusting elements for a game controller and preferably at least three aforementioned adjusting elements for a game controller, said adjusting elements being different and allowing a blocking in rotation of the control member in the stop position with different respective stop angle values ($\alpha$) for each identical tilt direction of the control member.

More specifically, said assembly may comprise the following additional and optional features, taken in isolation, or in combination with each other:
- the adjusting elements are constituted respectively by adjusting rings, the outer face of which forms a straight cylinder with a circular cross-section over at least part of the height of the adjusting ring, and the outer diameters of said cylindrical parts with a circular cross-section of the outer faces of the adjusting rings are different.
- the adjusting rings have the same internal cross-section, and in particular the same internal diameter, and preferably in which the adjusting rings have the same height.

Another object of the invention is also a method for adjusting the stop angle of the pivoting control member of an above-mentioned game controller. This adjusting method comprises mounting a removable adjusting element on the control member, without disassembling the shell of the game controller so that the control member provided with this removable adjusting element is able to be manually tilted in each tilt direction until it reaches a stop position in which this adjusting element abuts and makes it possible to block the tilting of the control member.

More particularly, the control member comprises a removable head; in order to assemble the adjusting element, the removable head of the control member is removed beforehand, and once the adjusting element is mounted, the removable head of the control member is replaced.

BRIEF DESCRIPTION OF THE DRAWINGS

The features and advantages of the invention will become apparent from reading the detailed description below of several particular embodiments of the invention, which particular embodiments are described as non-limiting and non-exhaustive examples of the invention, and with reference to the accompanying drawings in which.

DETAILED DESCRIPTION

Figure 1:
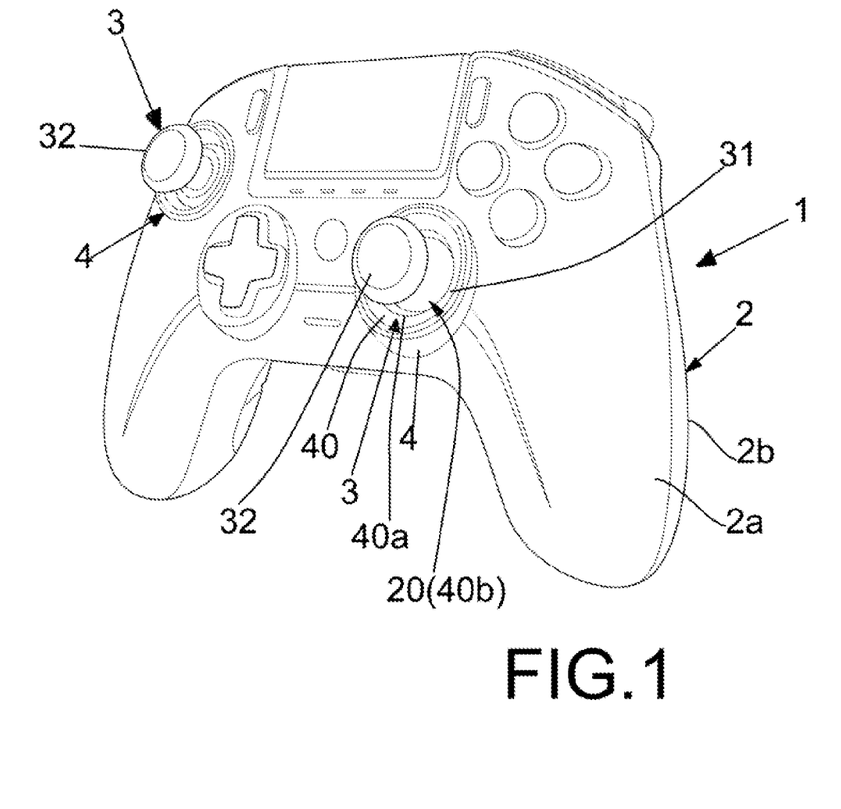
FIG. 1 is an isometric perspective view of a variant embodiment of a game controller according to the invention.

FIG. 1 shows a particular example of a game controller 1 comprising an assembled shell 2, and control means in particular comprising two pivoting control members 3: a pivoting member 3 located in the left part of the game controller 1 and a pivoting member 3 located in the right part of the game controller 1.

The assembled shell 2 comprises, in a manner known per se, an upper half-shell 2a, which is assembled by any means, for example mechanically by means of screws or the like and/or by gluing and/or by welding, with a lower half-shell 2b.

In this particular example, the assembled shell 2 more particularly has an ergonomic shape adapted to facilitate gripping thereof with both hands by a player.

Each pivoting member 3 is passed through an opening 20 of the upper half-shell 2a, more particularly a circular opening 20.

Figure 3:
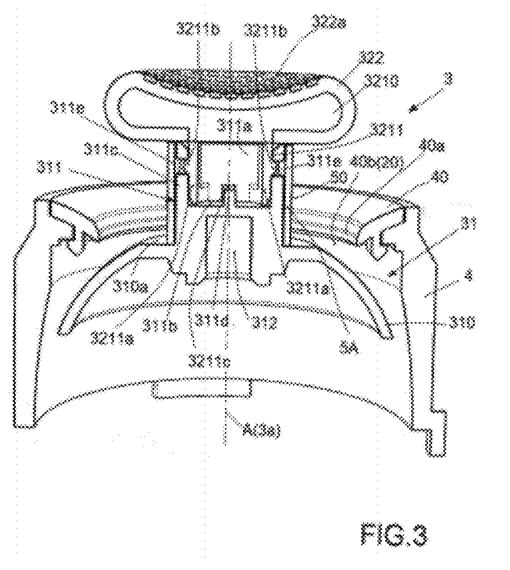
FIG. 3 is a cross-sectional view of the pivoting control member of FIG. 2, when assembled and mounted through the opening of a cylindrical insert secured through the shell of the game controller, the pivoting control member being provided with the thin and removable adjusting ring of FIG. 2, the shell of the game controller not being shown in this FIG. 3, the lower pivoting base element of the pivoting control member of FIG. 2 not being shown in FIG. 3, and the pivoting control member being in its rest position.

More particularly in this specific embodiment, with reference to FIGS. 1 and 3, and in a nonlimiting manner relative to the invention, at each circular opening 20 of the upper half-shell 2a, the game controller 1 comprises a cylindrical tubular insert 4, which is mounted in an opening 20 of the upper half-shell 2a of the controller 2, and is fastened to the upper half-shell 2a. The upper part of this insert 4 is provided with a ring 40 whose inner edge 40a delimits a circular opening 40b (FIG. 3) of smaller diameter than the diameter of the opening 20 of the shell 2. When this tubular insert 4 is mounted and is fastened in a circular opening 20 of the upper half-shell 2a of the game controller 1, the circular opening 40b of this tubular insert 4 is centered relative to this opening 20.

In another variant embodiment, the game controller may not comprise such a tubular insert 4, and/or may not comprise a ring 40. In the absence of ring 40, the aforementioned inner edge 40a is replaced by the inner edge of the opening 20 in the upper half-shell 2a of the game controller. In another variant embodiment, the ring 40 can be an integral part of the upper half-shell 2a or be an add-on part, which can be fixed permanently or removably to the tubular insert 4 or directly at the opening 20 of the upper half-shell 2a.

In the particular embodiment of FIG. 1, each pivoting member 3 is of the "joystick" type, and is positioned near the edge of the shell 2, so as to be able to be easily manipulated by the left thumb or the right thumb of a player holding the game controller.

Each pivoting control member 3 of the game controller 1 is formed by a monolithic assembly of several elements 30, 31, 32, which will now be described with reference to FIGS. 2 and 3, and is further provided with ring cylindrical and removable adjusting ring 5A.

Pivoting Control Member 3

The element 30 (FIG. 2) of each pivoting control member 3 is a base element which is intended to be mounted and fixed permanently with respect to the shell 2 of the game controller. This base element 30 of each pivoting control member 3 is known and will therefore be described briefly below.

Figure 2:
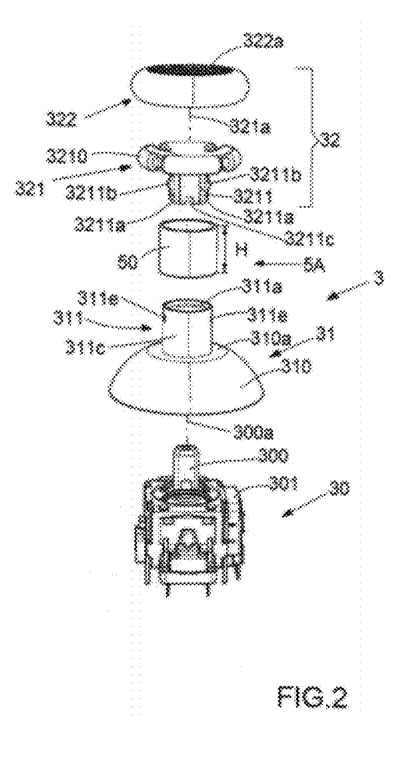
FIG. 2 is an exploded view of an embodiment of a pivoting control member and of a thin adjusting ring which can be removably adapted to this pivoting control member.

With reference to FIG. 2, this base element 30 comprises a cylindrical shaft ("stick") 300, with a central axis 300a, which is mounted to pivot relative to a casing 301. This pivoting cylindrical shaft 300 is able to be tilted manually with respect to the casing 301, in all directions, from a central rest position, illustrated in FIGS. 1 and 2, into which it returns in a rotationally elastic manner. The means for elastically rotating into the central rest position of this shaft 300 are known and will therefore not be described in detail. These elastic return means, of the spring type, are housed inside the casing 301.

This pivoting shaft 300 is also, and in the usual manner, coupled to analog displacement sensors, for example potentiometer-type sensors, which are housed inside the casing 301, and which make it possible to measure the angles of rotation of this shaft 300, respectively about two reference axes of rotation, which are perpendicular to each other and which define a plane perpendicular to the central axis 300a of the shaft 300 in its rest position in FIG. 2. In a known manner, these sensors deliver analog measurement signals which are characteristic of the instantaneous value of the angle formed by the central axis 300a of the shaft 300, about each reference axis of rotation, with respect to the rest position of this axis 300a.

The base element 30 is mounted and fastened to the inside of the shell 2 of the game controller 1, so that on the one hand its casing 301 is fully housed inside the assembled shell 2 and is fastened to the assembled shell 2, and on the other hand its pivoting shaft 300 is positioned perpendicular to the circular opening 40b of the tubular insert 4 described above and is centered with respect to this circular opening 40b. The element 31 of each pivoting control member 3 is a protective part which is symmetrical and rigid, and which comprises:
  in the lower part, a dome-shaped cup 310 and
  in the upper part, a cylindrical assembly end piece 311, which is centered relative to the lower cup 310, the central axis of symmetry of the cup 310 being coincident with the central axis of symmetry of this cylindrical end piece 311.

More particularly, the cylindrical assembly end piece 311 comprises a cavity 311a (FIGS. 2 and 3) which is open at the top and which is delimited by a bottom wall 311b and a side wall 311c, which is preferably cylindrical. The bottom wall comprises (FIG. 3) a projecting central lug 311d. The side wall 311c comprises preferably diametrically opposed assembly slots 311e.

Referring to FIG. 3, the protective element 31 further comprises, in its lower part, a central cylindrical housing 312. This central cylindrical housing 312 is dimensioned so as to allow a tight fitting in this housing 312 of the pivoting shaft 300 of the base element 30. The cross-section of this cylindrical housing 312 and the cross-section of the pivoting shaft 300 are not circular and are chosen so as to allow the pivoting shaft 300 to be blocked in rotation about its central axis in this housing 312. The element 31 is mounted simply by axially fitting the element 31 onto the pivoting shaft 300 of the base element 30.

The cup 310 of the protective element 31 is dimensioned such that its maximum external diameter is greater than the diameter of the opening 40b of the tubular insert 4. The cup of the element 31 makes it possible to partially close the opening 40b of the tubular insert 4, without hindering the pivoting of the shaft 300 of the base element 30, which makes it possible in particular to avoid the accidental introduction of foreign bodies or elements inside the assembled shell 2 and also makes it possible to improve the aesthetic appearance of the game controller 1.

The element 32 constitutes the head of the pivoting control member 3 and, once mounted, is positioned (FIG. 1) on the outside of the assembled shell. This head 32 has a geometry and dimensions suitable for the manipulation by a player of the pivoting control member 3, preferably using one of his two thumbs.

More particularly, this head 32 is removable so that it can be easily and quickly mounted or removed by a user, in particular without having to disassemble the shell 2 from the game controller 1.

In this particular example, this head 32 is made up of sub-elements 321, 322.

The sub-element 321 is a symmetrical monobloc part having a central axis of symmetry 321a, and is for example an injected plastic part. It comprises a substantially disc-shaped upper part 3210 and a lower cylindrical part 3211, which is oriented perpendicular to said disc-shaped upper part 3210, and which is centered with respect to said disc-shaped upper part 3210.

The sub-element 322 is disc-shaped, and is intended to be in contact with the player's thumb. The sub-element 322 is generally molded onto the disc-shaped upper part 3210 of the sub-element 321 or can be fastened by any means, in a permanent and robust manner, to the disc-shaped upper part 3210 of the sub-element 321.

This sub-element 322 can for example be made of rubber to improve grip with the user's thumb.

The upper face 322a of the sub-element 322 can for example be curved and concave as illustrated in FIG. 3. In another variant, the upper face 322a of the sub-element 322 may for example be domed and convex or may be planar.

The cylindrical lower part 3211 of the sub-element 321 of the head 32 is elastically deformable to allow it to be elastically fitted into the cylindrical assembly end piece 311 of the protective element 31.

More particularly, in the specific variant embodiment of FIGS. 2 and 3, the cylindrical lower part 3211 of the head 32 comprises diametrically opposed legs 3211a, which are each provided with an external assembly lug 3211b. Each assembly lug 3211b can be pressed in under the action of a mechanical stress and can, in the absence of a mechanical stress, elastically return to its rest position of FIG. 2, in which it protrudes toward the outside of the leg 3211a. The cylindrical lower part 3211 of the head 32 also comprises a lower slit 3211c adapted to the geometry of the lug 311d of the protective part 31.

To assemble the head 32 with the protective element 31 (FIG. 3), it suffices to insert the cylindrical lower part 3211 of the head 32 axially by hand into the cylindrical cavity 311a of the cylindrical assembly end piece 311 of the protective element 31, until the lug 311d protruding in the bottom of the cylindrical cavity 311a enters the slit 3211c, which ultimately makes it possible to obtain a blocking in rotation of the head 32 relative to the protective element 31. During this axial insertion, a slight depression of each lug 3211b is obtained toward the interior of the legs 3211a until each lug 3211b is positioned opposite an assembly slot 311e of the cylindrical assembly end piece 311 and enters this assembly slot 311e (configuration of FIG. 3), which allows axial blocking of the head 32 relative to the protective element 31.

The elasticity of the assembly lugs 3211b further allows radial clamping of the cylindrical lower part 3211 of the head 32 relative to the cylindrical assembly end piece 311. This radial clamping is strong enough to prevent accidental dislocation of the head 32 relative to the protective element 31. However, this radial clamping is weak enough to allow a user to intentionally dislodge the head 32 from the protective element 31, by pulling axially by hand and with sufficient force on the head 32, so as to obtain, under the effect of this axial traction, a depression of the assembly lugs 3211*b* toward the interior of the legs 3211*a* which is sufficient to cause the lugs 3211*b* to leave their respective assembly slots 311*e*.

The head 32 is thus easily and quickly removable by hand by a player, which if necessary allows a user to easily and quickly place the removable adjusting ring 5A on the game controller 1 or to easily and quickly remove it from the game controller 1 without having to disassemble the shell 2 of the game controller 1.

Removable Adjusting Ring 5A

Each pivoting control member 3 is provided with a rigid and removable cylindrical adjusting ring 5A, of height H.

The material constituting this adjusting ring 5A is of no importance for the invention.

In this particular example, this adjusting ring 5A comprises an outer face 50 forming, over the entire height H of the ring 5A, a straight cylinder of circular cross-section.

In another variant embodiment, the outer face 50 of this adjusting ring 5A could form a straight cylinder of circular cross-section only over part of the height H of the ring.

The internal section, and in particular the internal diameter $D_{in}$ (FIG. 6A) of this ring 5A is chosen so as to allow the mounting of this ring 5A on the assembly end piece 311 of the element 31 with a minimum clearance that is just sufficient to allow guided axial sliding of the ring 5A on the assembly end piece 311 of the element 31. The adjusting ring 5A can therefore be slipped over the assembly end piece 311 of the protective element 31, in a removable manner, without being fixed to this protective element 31.

As will appear more clearly later, the choice of the external diameter $D_{out}$ (FIG. 6A, 6B, 6C) of this cylindrical adjusting ring allows adjustment of the stop angle of the pivoting member 3.

Mounting and Assembly of the Pivoting Member and the Removable Adjusting Ring

The mounting and assembly of a pivoting member 3 provided with a removable adjusting ring is carried out for example by proceeding as follows.

Each base element 30 assembled with the associated protective element 31 is fastened in one of the upper 2*a* or lower 2*b* half-shells at a predefined location and is electrically connected to an electronic control circuit of the game controller intended to be housed inside the shell 2.

This electronic control circuit in particular allows the automatic processing of the measurement signals delivered by the rotational displacement sensors of the pivoting control member 3. This electronic control circuit can comprise one or more electronic memories, a processor which is capable of automatically executing embedded software, and which can be implemented for example by means of a microprocessor, a microcontroller, a programmable electronic circuit of the FPGA type or a specific electronic circuit of the ASIC type, and one or more connectors allowing the processor to communicate with a game console or the like.

Then, the upper half-shell 2*a* provided with a tubular insert 4 at each opening 20 is positioned on the lower half-shell 2*b*, such that the shaft 300 of each pivoting control member 30, in its central rest position and carrying the protective element 31, is oriented perpendicularly relative to the circular opening 40*b* of the tubular insert 4 and is centered relative to this circular opening 40*b*. Finally, the two half-shells 2*a*, 2*b* are assembled together, for example by means of screws.

Once the two half-shells 2*a*, 2*b* are assembled to form the shell 2 of the game controller 1, as shown in FIG. 3, the cylindrical assembly end piece 311 of the protective element 31, which is also centered with respect to the circular opening 40*b* of the tubular insert 4, is preferably passed through the opening 40*b* of the insert and protrudes outside the assembled shell 2, so that it is at least in part located and easily accessible outside the assembled shell 2.

The aforementioned assembly steps are carried out in the factory.

The user can easily and quickly configure the game controller 1 obtained at the end of the aforementioned assembly steps, by choosing an adjusting ring, for example the thin adjusting ring 5A, having a specific external diameter $D_{out}$ which defines the stop angle of the pivoting control member 3, and by removably slipping this adjusting ring on the cylindrical assembly end piece 311 of the protective element 31.

Once this adjusting ring is mounted, the user simply needs to fit the removable head 32 into the cylindrical assembly end piece 311 of the protective element 31, as described above. Once the head 32 has been fitted onto the protective element 31 (FIG. 3), the adjusting ring is axially blocked in position between the upper face 310*a* of the cup 310 of the protective element 31 and the removable head 32.

Stop Angle of the Pivoting Control Member 3

The central axis of symmetry of the tubular insert 4 is referenced A in FIG. 3, that is to say, in this particular embodiment, the central axis of symmetry of the circular opening 40*b* delimited in the shell 2 assembled by the upper ring 40 of this insert 4.

In this FIG. 3, the pivoting control member 3 provided with its adjusting ring 5A is in its central rest position, its axis of symmetry 3*a* being, in this central rest position, coincident with the central axis of symmetry A of the circular opening 40*b*.

As described above, the user of the game controller 1 can manually rotate this control member 3, provided with its adjusting ring 5A, in all directions by tilting it relative to the central rest position of FIG. 3. When the user of the game controller 1 releases this control member 3, the latter elastically returns to its central rest position in FIG. 3.

Figure 4:
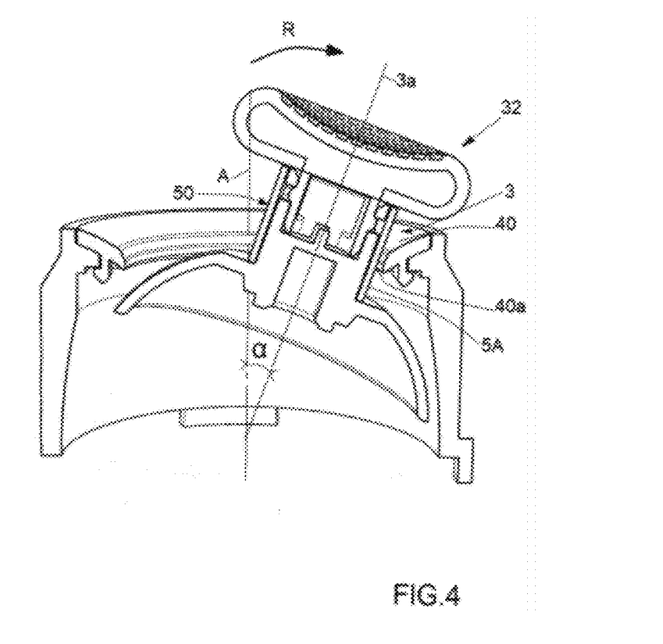
FIG. 4 is a cross-sectional view showing the pivoting control member of FIG. 3, which is provided with the thin adjusting ring, and which is tilted in the stop position.

Whatever its tilt direction, the control member 3, provided with its adjusting ring 5A, can pivot (FIG. 4/rotation R) until it reaches a stop position, for example such as that in FIG. 4. In this stop position, the adjusting ring 5A is in abutment and the tilting of the pivoting control member 3 is thus blocked in this stop position. The adjusting ring 5A thus makes it possible to adjust the maximum travel of the tilting of the pivoting control member 3.

In the particular case of FIG. 4, the inner edge 40*a* of the ring 40 surrounds the control member 3 over its entire periphery. In the stop position of the control member 3 provided with its adjusting ring 5A, the control member 3 abuts against the inner edge 40*a* of the ring 40 by means of said adjusting ring 5A, the inner edge 40*a* of the ring 40 fulfilling a low rotational stop function.

The stop position of the control member 3 provided with its adjusting ring 5A is characterized by a stop angle α (FIG. 4), which corresponds to the maximum angle formed by the two central axes of symmetry A and 3*a* for a given tilt direction of the control member 3.

In the embodiment of the appended figures, but in a non-limiting manner with respect to the invention, the value of the stop angle α is preferably the same for all the tilt directions of the control member 3 provided with its adjusting ring.

In another variant embodiment, the value of the stop angle α may be different for at least two different tilt directions of the control member 3 provided with its adjusting ring and/or the geometry of the opening 40b is not necessarily circular, but may for example be of the polygonal type or of the elliptical type and/or the rest position is not necessarily a central position.

Typically, the value of the stop angle of the pivoting control member 3 of a game controller is less than 90° and generally between 20° and 70°.

Figure 5:
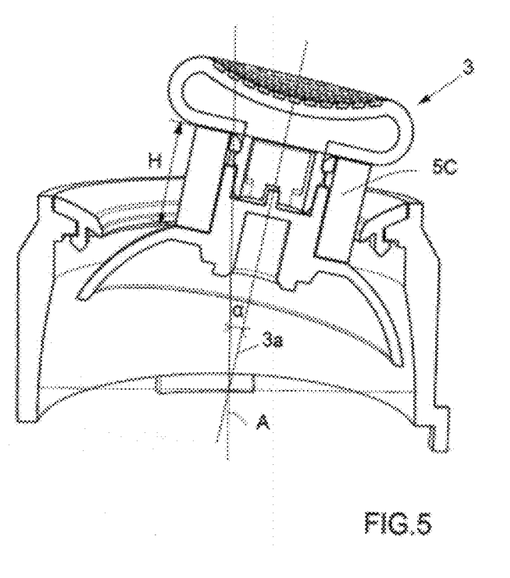
FIG. 5 is a cross-sectional view showing the pivoting control member of FIG. 3 which is provided with a thick adjusting ring and which is tilted in the stop position.

FIG. 5 shows a variant embodiment in which the pivoting control member 3 is provided with a cylindrical adjusting ring 5C, of the same height H as the ring 5A, thicker than the thin ring 5A, and thus having an external diameter $D_{out}$ (FIG. 6C) which is greater than that of the thin ring 5A. In this case, the stop angle α is set to a value less than that of the stop angle obtained with the thin ring 5A.

The value of the stop angle α thus depends on the external diameter $D_{out}$ of the cylindrical adjusting ring used. The larger this external diameter, the smaller the value of the stop angle α will be, and vice versa.

Figure 6A:
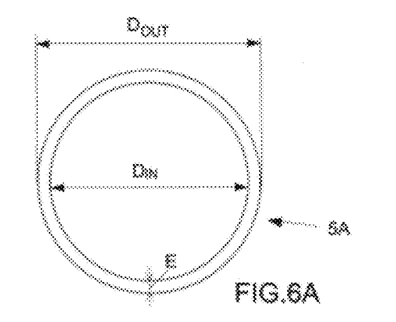
FIG. 6A is a top view of the thin adjusting ring of FIGS. 3 and 4.
Figure 6B:
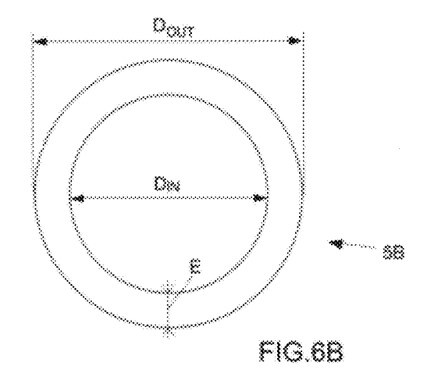
FIG. 6B is a top view of an adjusting ring having a thickness midway between the thickness of the thin ring of FIG. 6A and that of the thick ring of FIG. 6C.
Figure 6C:
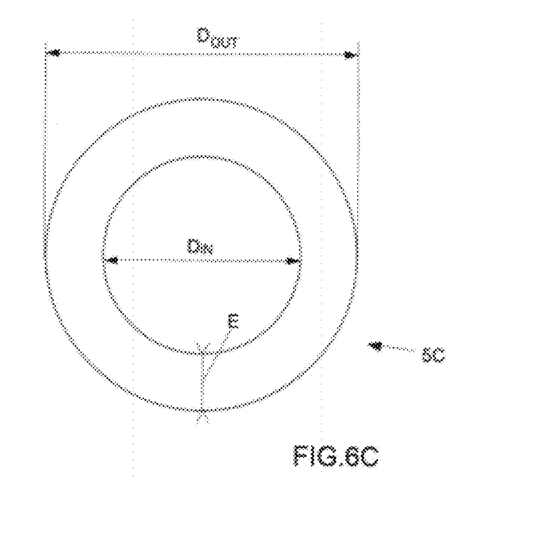
FIG. 6C is a top view of the thick adjusting ring of FIG. 5.

Preferably, the user of the controller has several removable adjusting rings at his disposal for each pivoting control member 3, such as for example the cylindrical adjusting rings 5A, 5B, 5C of FIG. 6A, 6B, 6C, respectively. These cylindrical adjusting rings 5A, 5B, 5C of FIG. 6A, 6B, 6C have the same internal section, and in particular the same internal diameters $D_{in}$, but have different thicknesses E, and therefore have different external diameters $D_{out}$. These cylindrical adjusting rings 5A, 5B, 5C preferably have the same height H.

The thinnest ring 5A makes it possible to obtain the largest stop angle value a and for example allows a stop angle of 46°. The thickest adjusting ring 5C makes it possible to obtain the smallest stop angle value a and for example allows a stop angle of 30°. The ring 5B of intermediate thickness makes it possible to obtain an intermediate stop angle value a and for example a stop angle α of 38°.

The lower the value of the stop angle α, the greater the responsiveness of the pivoting control member 3 of the game controller, and vice versa.

Owing to the adjusting rings 5A, 5B, 5C, the user of the controller can advantageously adjust the responsiveness of a pivoting control member 3 of his game controller 1 very easily and very quickly, in particular to make this responsiveness more suited to the type of game he wishes to play. All he has to do is remove the removable head 32 from the pivoting control member 3 by hand, remove the adjusting ring present on the control member 3, if necessary, insert the new adjusting ring 5A, 5B or 5C corresponding to the responsiveness desired by the user for the pivoting control member 3 onto the protective element 31, and replace the removable head 32; all these operations are advantageously carried out easily by the user without having to disassemble the assembled shell 2 of the game controller 1.

Thus, when the user of the game controller wishes to have a more responsive controller, for example to play a fighting game, he can choose to equip each pivoting control member 3 of his game controller 1 with the adjusting ring 5C making it possible to obtain the smallest stop angle α. When the user of the game controller wishes to have a less responsive controller, he can choose to equip each pivoting control member 3 of his game controller 1 with the adjusting ring 5B or 5A making it possible to obtain larger stop angle values α.

Other Variant Embodiments (Non-Exhaustive List)

The invention is not limited to the particular variant embodiment of the appended figures.

In particular, and in a non-exhaustive manner, the invention is not limited to the particular structure and to the particular dimensions of the sub-elements 321 and 322 forming the head 32 and illustrated in the appended figures.

The invention is not limited to the implementation of a head 32 in two assembled parts 321 and 322, but in another variant the head 32 may comprise more than two assembled parts or could be made in one piece, for example an injected plastic part.

The head 32 is not necessarily specifically adapted to be manipulated by means of a thumb of the hand, the invention extending more generally to any pivoting control member 3 that can be manipulated manually, whatever in particular the structure, the geometry, the dimensions and the constituent materials of the head 32 of the control member 3. For example, the control member 3 can be a pivoting "stick" of the "joystick" type which can be grasped with two fingers of one hand or with the whole hand.

The means for assembling the removable head 32 may be different from those which have been previously described, the removable head for example being able to be screwed on or assembled by means of magnets or the like.

In another variant, the cylindrical assembly end piece 311 of the protective element 31 (or of another element of the control member 3) could be adapted so as to be fitted inside a tubular lower part 3211 of the removable head 32, the adjusting ring being designed in this case to be slipped over this tubular lower part 3211 of the head 32.

In another variant, the head 32 is not necessarily removable. In this case, the stop angle adjusting ring may for example be in two separate parts which can be assembled together so as to allow the adjusting ring to be mounted on the pivoting control member without disassembling the shell 2 and without removing the head 32 from the pivoting control member. For example, the adjusting ring may consist of two half-cylinders which can be assembled on the control member by magnetic magnetization to constitute the adjusting ring; the two half-cylinders can be magnetized or the pivoting control member 3 can be magnetized and the two half-cylinders can be made from a ferromagnetic material, and for example from metal. The two half-cylinders can also be assembled together by any other means, so as to be able to be separated from one another, for example by screwing, clipping or fitting.

The protective element 31 of the variant of the appended figures is optional and could be omitted. In this case, the head 32 of the pivoting control member is designed to be fitted directly onto the pivoting shaft 300 of the base element 30, without an intermediate part 31.

In the invention, the removable adjusting element 5A, 5B, 5C preferably has an outer face 50 forming a straight cylinder of circular cross-section.

In another variant, the cross-section of this outer face 50 may not be circular, and may for example be of the polygonal or elliptical type.

The invention is not limited to the implementation of adjusting rings 5A, 5B, 5C having a circular inner section. The geometry of the internal sections of the adjusting rings 5A, 5B, 5C is of no importance for the invention, this internal section possibly being polygonal (triangular, square, rectangular, hexagonal, etc.) for example In another variant embodiment, the adjusting elements may be constituted by removable cylindrical adjusting rings, which are adapted so as to be able to be slipped coaxially on one another, so as to obtain a removable adjusting element whose external diameter depends on the number of coaxial rings. The greater the number of adjusting rings mounted coaxially with respect to one another on the pivoting control member, the lower the value of the stop angle α of the pivoting control member, and vice versa.

The invention claimed is:

1. A game controller (1) comprising an assembled shell (2) and control means comprising at least one control member (3), which is passed through the assembled shell (2), which comprises, on the outside of the assembled shell (2), a head (32) for manipulating the control member (3), which is pivotable and can be tilted manually in all directions from a rest position into which it returns in a rotationally elastic manner, characterized in that the control means further comprise at least one adjusting element (5A; 5B; 5C) for adjusting the stop angle (α) of the control member (3), which adjusting element (5A; 5B; 5C) can be removably mounted on the control member (3) and removed from the control member (3) without disassembling the shell (2) of the game controller (1), and in that the control member (3) provided with said removable adjusting element (5A; 5B; 5C) can be tilted manually in each tilt direction until it reaches a stop position in which the adjusting element (5A; 5B; 5C) abuts and allows the tilting of the control member to be blocked (3).

2. The game controller according to claim 1, wherein the head (32) of the control member (3) is removable and wherein said adjusting element (5A; 5B; 5C) is able to be removably mounted on the control member (3) when the head (32) is removed.

3. The game controller according to claim 2, wherein said adjusting element (5A; 5B; 5C) is a ring, which is able to be slipped in a removable manner on a part (311) of the control member (3) when the head (32) is removed.

4. The game controller according to claim 1, wherein the control member (3) comprises an assembly end piece (311) having an open cavity (311a) in the upper part, wherein a part (3211) of the removable head (32) can be inserted into said cavity (311a), and wherein said adjusting element (5A; 5B; 5C) can be removably mounted onto the assembly end piece (311) when the head (32) is removed.

5. The game controller according to claim 1, wherein said adjusting element (5A; 5B; 5C) is able to be removably mounted on the control member (3) by being axially blocked between the head (32) of the control member (3) and another part (310a) of the control member (3).

6. The game controller according to claim 1, wherein the value of the stop angle (α), which is the tilt angle, with respect to its rest position, of the control member (3) provided with said adjusting element (5A; 5B; 5C) and tilted in the stop position, is identical for all tilting directions of the control member (3).

7. The game controller according to claim 1, wherein the value of the stop angle (α), which is the tilt angle, with respect to its rest position, of the control member (3) provided with said adjusting element (5A; 5B; 5C) and tilted in the stop position, is less than 90°.

8. The game controller according to claim 1, wherein the stop angle (α) being the tilt angle, with respect to its rest position, of the pivoting control member (3) provided with said adjusting element (5A; 5B; 5C) and tilted in the stop position, said controller comprises at least two different adjusting elements (5A/5B; 5A/5C; 5B/5C), which allow said blocking of the tilt of the member (3) in the stop position with different respective stop angle values (α) for each identical tilt direction.

9. The game controller according to claim 1, comprising an inner edge (40a), which surrounds the control member (3) and which delimits an opening (40b) in the assembled shell (2) through which the control member (3) is positioned, and wherein said inner edge (40a) acts as a bottom rotational stop when the control member (3) provided with said adjusting element (5A; 5B; 5C) is tilted in the stop position.

10. The game controller according to claim 1, comprising an inner edge (40a), which surrounds the control member (3) and which delimits an opening (40b) in the assembled shell (2) through which the control member (3) is positioned, and wherein the adjusting element (5A; 5B; 5C), when mounted on the control member (3), is positioned through said opening (40b), one part of the adjusting element (5A; 5B; 5C) being housed inside the shell (2) and another part of the adjusting element (5A; 5B; 5C) being positioned outside the shell (2).

11. The game controller according to claim 1, wherein each adjusting element is a cylindrical adjusting ring (5A; 5B; 5C).

12. The game controller according to claim 11, wherein the outer face (50) of each cylindrical adjusting ring (5A; 5B; 5C) forms a straight cylinder with a circular cross-section over at least part of the height (H) of the adjusting ring.

13. The game controller according to claim 1, comprising at least two different adjusting elements (5A/5B; 5A/5C; 5B/5C), constituted respectively by adjusting rings, the outer face (50) of which forms a straight cylinder with a circular cross-section over at least part of the height (H) of the adjusting ring, and the outer diameters ($D_{out}$) of said cylindrical parts with a circular cross-section of the outer faces (50) of the adjusting rings are different.

14. The game controller according to claim 13, wherein the adjusting rings have the same internal cross-section, and in particular the same internal diameter ($D_{in}$).

15. The game controller according to claim 1, wherein part (30) of the pivoting control member (3) is housed and is fastened inside the assembled shell (2), and the game controller comprises sensors positioned inside the assembled shell (2) and measuring the rotation of the pivoting control member (3).

16. An adjusting element (5A; 5B; 5C) for adjusting the stop angle (α) of the pivoting control member (3) of a game controller (1), said game controller (1) comprising an assembled shell (2) through which the control member (3) has passed, which control member (3) comprises a head (32) for manipulating it on the outside of the shell (2), and is able to be tilted manually in all directions, from a rest position into which it returns in a rotationally elastic manner, to a stop position, the adjusting element (5A; 5B; 5C) for adjusting the stop angle (α) of the pivoting control member (3) can be mounted removably on the control member (3) and can be removed from the control member (3) without disassembling the shell (2) from the game controller (1).

17. The adjusting element for a game controller according to claim 16, further comprising a removable ring (5A; 5B; 5C).

18. The adjusting element for a game controller according to claim 17, further consisting of a removable ring (5A; 5B; 5C), the outer face (50) of which forms a straight cylinder with a circular cross-section over at least part of the height (H) of the adjusting ring.

19. The game controller according to claim 1 comprising at least two adjusting elements (5A/5B; 5A/5C; 5B/5C), said adjusting elements being different and allowing a blocking in rotation of the control member (3) in the stop position with different respective stop angle values (a) for each identical tilt direction of the control member (3).

20. The game controller according to claim 19, wherein the adjusting elements are constituted respectively by adjusting rings, the outer face (50) of which forms a straight cylinder with a circular cross-section over at least part of the height (H) of the adjusting ring, and wherein the outer diameters ($D_{out}$) of said cylindrical parts with a circular cross-section of the outer faces (50) of the adjusting rings are different.

21. The game controller according to claim 20, wherein the adjusting rings have the same internal cross-section, and in particular the same internal diameter ($D_{in}$).

22. A method for adjusting the stop angle ($\alpha$) of a pivoting control member (3) of a game controller (1) having an assembled shell (2) and control means comprising at least one control member (3), which is passed through the assembled shell (2), which comprises, on the outside of the assembled shell (2), a head (32) for manipulating the control member (3), which is pivotable and can be tilted manually in all directions from a rest position into which it returns in a rotationally elastic manner, characterized in that the control means further comprise at least one adjusting element (5A; 5B; 5C) for adjusting the stop angle ($\alpha$) of the control member (3), which adjusting element (5A; 5B; 5C) can be removably mounted on the control member (3) and removed from the control member (3) without disassembling the shell (2) of the game controller (1), and in that the control member (3) provided with said removable adjusting element (5A; 5B; 5C) can be tilted manually in each tilt direction until it reaches a stop position in which the adjusting element (5A; 5B; 5C) abuts and allows the tilting of the control member to be blocked (3), said method comprising:

mounting at least one of the removable adjusting element (5A; 5B; 5C) each having an external diameter $D_{out}$ on the control member (3), without disassembling the shell (2) of the game controller (1) so that the control member (3) provided with this other removable adjusting element (5A; 5B; 5C) is able to be manually tilted in each tilt direction until it reaches a stop position with the corresponding stop angle ($\alpha$) in which this adjusting element (5A; 5B; 5C) abuts and makes it possible to block the tilting of the control member (3); and where a value of the stop angle (a) depends on the external diameter $D_{out}$ of the adjusting element (5A; 5B; 5C) used.

23. The method according to claim 22, wherein the control member (3) comprises a removable head (32), in order to assemble the adjusting element (5A; 5B; 5C), the removable head (32) of the control member (3) is removed beforehand, and once the adjusting element (5A; 5B; 5C) is mounted, the removable head (32) of the control member (3) is replaced.

* * * * *